US007158728B2

United States Patent
Kasahara et al.

(10) Patent No.: US 7,158,728 B2
(45) Date of Patent: Jan. 2, 2007

(54) OPTICAL REPEATING SYSTEM AND OPTICAL AMPLIFYING REPEATER CONTROL METHOD

(75) Inventors: Yasunori Kasahara, Tokyo (JP); Hideki Goto, Tokyo (JP); Takashi Mizuochi, Tokyo (JP); Kenkichi Shimomura, Tokyo (JP); Yukio Horiuchi, Saitama (JP); Masatoshi Suzuki, Saitama (JP); Daishi Ishii, Tokyo (JP); Toshio Kawazawa, Tokyo (JP)

(73) Assignees: Mitsubishi Denki Kabushiki Kaisha, Tokyo (JP); KDDI Corporation, Tokyo (JP); KDDI Submarine Cable Systems Inc., Tokyo (JP)

( * ) Notice: Subject to any disclaimer, the term of this patent is extended or adjusted under 35 U.S.C. 154(b) by 599 days.

(21) Appl. No.: 10/191,319

(22) Filed: Jul. 10, 2002

(65) Prior Publication Data

US 2003/0011856 A1 Jan. 16, 2003

(30) Foreign Application Priority Data

Jul. 11, 2001 (JP) ............................. 2001-211194

(51) Int. Cl.
*H04B 10/02* (2006.01)

(52) U.S. Cl. ...................... 398/177; 398/173; 398/181; 398/11; 398/18; 398/30; 398/31; 398/33; 398/37; 359/341; 359/337; 359/333

(58) Field of Classification Search .................. 398/11, 398/30, 18, 37, 177, 173, 181, 33, 31; 359/110, 359/177, 341, 337, 333
See application file for complete search history.

(56) References Cited

U.S. PATENT DOCUMENTS

| 4,449,247 | A |   | 5/1984  | Waschka, Jr.               |
|-----------|---|---|---------|----------------------------|
| 5,535,037 | A | * | 7/1996  | Yoneyama ............... 398/181 |
| 6,075,633 | A |   | 6/2000  | Deguchi et al.             |
| 6,404,527 | B1| * | 6/2002  | Jensen .................... 398/177 |
| 6,452,701 | B1| * | 9/2002  | Terahara et al. ........... 398/30 |
| 6,819,875 | B1| * | 11/2004 | Touma ..................... 398/177 |

FOREIGN PATENT DOCUMENTS

| EP | 1 168 683 A2 | 1/2002  |
| JP | 2-53338      | 2/1990  |
| JP | 3-270522     | 12/1991 |
| JP | 4-371030     | 12/1992 |
| JP | 05-130058    | 5/1993  |
| JP | 9-321739     | 12/1997 |

* cited by examiner

*Primary Examiner*—Hanh Phan
(74) *Attorney, Agent, or Firm*—Oblon, Spivak, McClelland, Maier & Neustadt, P.C.

(57) ABSTRACT

An optical repeating system includes an optical transmitter and a plurality of optical amplifying repeaters. The optical transmitter specifies a part or all of the optical amplifying repeaters, and transmits a supervisory command to the specified optical amplifying repeaters as a first sub-signal via an uplink or downlink optical transmission line. The supervisory command is a command to supervise internal circuits of the optical amplifying repeaters. Receiving the supervisory command addressed thereto via the uplink or downlink optical transmission line, the optical amplifying repeaters each transmit a supervisory signal indicating a supervisory result corresponding to the supervisory command to optical receivers via the uplink and downlink optical transmission lines as a second sub-signal. The optical system can reduce the time take to acquire the supervisory information about the plurality of the optical amplifying repeaters.

3 Claims, 6 Drawing Sheets

OPTICAL REPEATING SYSTEM AND OPTICAL AMPLIFYING REPEATER CONTROL METHOD

BACKGROUND OF THE INVENTION

1. Field of the Invention

The present invention relates to an optical repeating system that comprises an uplink optical transmission line, a downlink optical transmission line, an optical transmitter and an optical receiver for transferring a main signal through the uplink or downlink optical transmission line, and a plurality of optical amplifying repeaters for amplifying and repeating the main signal with optical amplifiers at intermediate positions on the optical transmission lines, and to an optical amplifying repeater control method for controlling the optical amplifying repeaters.

2. Description of Related Art

FIG. 4 is a block diagram showing a configuration of a conventional optical repeating system disclosed in JP2716882B2. In FIG. 4, the reference numeral 1 designates an optical transmitter for transmitting a main signal conveying information and a first sub-signal bearing a command for an optical amplifying repeater 3; 2 designates an optical fiber constituting an optical transmission line for interconnecting the optical transmitter 1, optical amplifying repeaters 3 and an optical receiver 4; 3 designates an optical amplifying repeater located at an intermediate position on the, optical fiber 2 for not only amplifying and transmitting the main signal with an, optical amplifier, but also for superimposing the supervisory information obtained from the command conveyed by the first sub-signal on the main signal as a second sub-signal, and 4.designates an optical receiver for receiving the main signal and the like.

FIG. 5 is a block diagram showing a configuration of the optical amplifying repeater as shown in FIG. 4. In the optical amplifying repeater 3 as shown in FIG. 5, the reference numeral 101 designates a coupler for splitting the input optical signal; 102 designates an optical amplifier comprising an isolator 111, a pumping laser diode 112, a multiplexing filter 113, an erbium (Er) doped optical fiber 114, and an isolator 115; and 103 designates a coupler for splitting an optical signal output from the optical amplifier 102, and for outputting its first part as the output optical signal.

In FIG. 5, the reference numeral 121 designates a photoelectric converter for converting an optical signal to an electrical signal; 122 designates an amplifier for amplifying the electrical signal; 123 designates a low-pass filter for filtering the sub-signal; 124 designates an incoming call identification circuit for making a decision as to whether the first sub-signal contains an operation command signal addressed to the present repeater; 125 designates a controller for actuating an encoder 131 and a modulator 132 in response to the operation command signal addressed to the present repeater; 131 designates the encoder for encoding intra-repeater information such as the power level of the output optical signal of the optical amplifying repeater 3, the amplification factor of the optical amplifier 102, the driving current level and temperature of the pumping laser diode 112; and 132 designates the modulator for modulating the driving current to be supplied from the pumping laser diode driver 133 to the pumping laser diode 112 by a supervisory signal including the intra-repeater information after encoding. The reference numeral 134 designates a temperature controller for controlling the temperature of the pumping laser diode 112; 141 designates a photoelectric converter for converting an optical signal to an electrical signal; and 142 designates an amplifier for amplifying the electrical signal.

FIG. 6 is a block diagram showing a configuration of the optical transmitter 1 in FIG. 4. In the optical transmitter 1 of FIG. 6, the reference numeral 201 designates a main signal circuit for outputting the main signal used for information transmission; 202 designates a sub-signal circuit for outputting the first sub-signal containing the operation command that specifies the, optical amplifying repeater; 203 designates a modulator for superimposing the first sub-signal on the main signal in a prescribed modulating scheme; 204 designates a driver supplied with the main signal on which the first sub-signal is superimposed for driving a semiconductor laser 205; and 205 designates the semiconductor laser for supplying the optical fiber 2 with the optical signal corresponding to the applied electrical signal.

FIG. 7 is a block diagram showing a configuration of the optical receiver in FIG. 4. In the optical receiver 4 of FIG. 7, the reference numeral 301 designates a photoelectric converter for converting the input optical signal fed from the optical fiber 2 to an electrical signal; 302 designates an amplifier for amplifying the electrical signal; 303 designates a main signal demodulator for demodulating the main signal in the received signal; 304 designates a low-pass filter for filtering the first and second sub-signals in the received signal; and 305 designates a sub-signal demodulator for demodulating the first and second sub-signals in the received signal.

Next, the operation of the conventional optical repeating system will be described.

First, the operation of the optical transmitter 1 will be described. The sub-signal circuit 202 generates the first sub-signal, which includes the operation command specifying one of the optical amplifying repeaters 3 by an address code uniquely assigned to each optical amplifying repeater, in such a manner that its amplitude is smaller and its rate is lower than those of the main signal output from the main signal circuit 201. Then, the modulator 203 supplies the driver 204 with the main signal on which the first sub-signal is superimposed. The output optical signal of the semiconductor laser 205 consists of the modulation signal of the main signal plus the first sub-signal superimposed thereon. The optical transmitter 1 transmits the operation command to the next optical amplifying repeater 3 as the first sub-signal in such a manner that an appropriate time interval is reserved after the first sub-signal including the operation command. The reserved time interval enables the specified optical amplifying repeater 3 to transmit a supervisory signal corresponding to the first sub-signal during the reserved time interval as the second sub-signal.

Next, the operation of the optical amplifying repeater 3 will be described. The coupler 101 splits the input optical signal fed from the input side optical fiber 2. A first part of the split input optical signal is launched into the optical amplifier 102 to be amplified. On the other hand, a second part of the split input optical signal is launched into the photoelectric converter 121 to be converted to the electrical signal. The electrical signal is amplified by the amplifier 122, and then the low-pass filter 123 extracts the first sub-signal with a frequency lower than the frequency of the main signal, and supplies it to the incoming call identification circuit 124. The incoming call identification circuit 124 makes a decision as to whether the optical transmitter 1 sends the operation command to this repeater from the address code contained in the first sub-signal, and notifies the controller 125 of the decision result. When the operation command is addressed to the repeater, the controller 125 actuates the encoder 131 and the modulator 132 to modulate the driving current to be supplied from the pumping laser diode driver 133 to the pumping laser diode 112 by the second sub-signal including the intra-repeater information. Since the driving current to the pumping laser diode 112 is modulated by the second sub-signal, the amplification factor of the optical amplifier 102 is modulated. Thus, the optical signal output from the Optical amplifier 102 consists of the main signal and he second sub-signal superimposed thereon. On the other hand, when there is no operation command addressed to the repeater, the controller 125 does not actuate the encoder 131 nor the modulator 132. As a result, the pumping laser diode 112 is driven by a non-modulated driving current.

Finally, the operation of the optical receiver 4 will be described. The input optical signal fed from the optical fiber 2 is converted by the photoelectric converter 301 into an electrical signal which is amplified by the amplifier 302. The amplified electrical signal is supplied to the main signal demodulator 303. In parallel with this, the low-pass filter 304 extracts the first and second sub-signals from the electrical signal, and supplies them to the sub-signal demodulator 305. The sub-signal demodulator 305 demodulates the operation command, which is addressed to the optical amplifying repeater 3, from the first sub-signal transmitted from the optical transmitter 1, and the intra-repeater information from the second sub-signal transmitted from the optical amplifying repeater 3. Thus, the operation state of each optical amplifying repeater 3 can be supervised.

In this way, the optical transmitter 1 selects one of the optical amplifying repeaters 3 one by one, and transmits the operation command by superimposing it on the main signal. Receiving the operation command addressed to it, each optical amplifying repeater 3 superimposes the supervisory information about the repeater on the main signal, and sends it to the optical receiver 4. The optical receiver 4 demodulates the supervisory information sent from the optical amplifying repeaters 3 sequentially.

With the foregoing configuration, the conventional optical repeating system must transmit a command to each one of the plurality of optical amplifying repeaters every time it acquires supervisory information from them. Therefore, the conventional optical repeating system has a problem of being it difficult to reduce the time for acquiring the supervisory information about the plurality of optical amplifying repeaters.

SUMMARY OF THE INVENTION

The present invention is implemented to solve the foregoing problem. It is therefore an object of the present invention to provide an optical repeating system and optical amplifying repeater control method capable of reducing the time taken to acquire the supervisory information about the plurality of optical amplifying repeaters.

According to a first aspect of the present invention, there is provided an optical repeating system comprising: an uplink optical transmission line; a downlink optical transmission line; optical transmitters and optical receivers for transmitting and receiving a main signal via at least one of the uplink and downlink optical transmission lines; and a plurality of optical amplifying repeaters each installed at an intermediate position on the optical transmission lines for amplifying and repeating the main signal with optical amplifiers, wherein at least one of the optical transmitters specifies a part or all of the plurality of optical amplifying repeaters, and transmits a supervisory command to specified optical amplifying repeaters as a first sub-signal, the supervisory command commanding to supervise internal circuits of the optical amplifying repeaters, and wherein the optical amplifying repeaters each transmit, when receiving the supervisory command addressed thereto via one of the uplink and downlink optical transmission lines, a supervisory signal indicating supervisory result corresponding to the supervisory command to the optical receivers as a second sub-signal via the uplink optical transmission line and the downlink optical transmission line.

Here, when specifying the plurality of optical amplifying repeaters, one of the optical transmitters may superimpose on the main signal a special code proper to the plurality of optical amplifying repeaters, and the plurality of optical amplifying repeaters may each store a common and proper special code in advance, and make a decision that they themselves are specified when they detect the proper special code in the main signal.

The plurality of optical amplifying repeaters may be each connected to a plurality of sets of uplink and downlink optical transmission lines, and transmit the second sub-signal through a set of optical transmission lines different from that through which the first sub-signal is received.

According to a second aspect of the present invention, there is provided an optical amplifying repeater control method of controlling an optical amplifying repeater in an optical repeating system including an uplink optical transmission line, a downlink optical transmission line, optical transmitters and optical receivers for transmitting and receiving a main signal via at least one of the uplink and downlink optical transmission lines, and a plurality of optical amplifying repeaters each installed at an intermediate position on the optical transmission lines for amplifying and repeating the main signal with optical amplifiers, the optical amplifying repeater control method comprising the steps of: specifying a part or all of the plurality of optical amplifying repeaters, and transmitting a supervisory command as a first sub-signal via one of the uplink and downlink optical transmission lines, the supervisory command commanding to supervise internal circuits of the optical amplifying repeaters; receiving the supervisory command addressed to the amplifying repeaters themselves via one of the uplink and downlink optical transmission lines; and transmitting, when the optical amplifying repeaters each receive the supervisory command addressed themselves, a supervisory signal indicating supervisory result corresponding to the supervisory command as a second sub-signal to the optical receivers via the uplink optical transmission line and the downlink optical transmission line.

DETAILED DESCRIPTION OF THE PREFERRED EMBODIMENTS

The invention will now be described with reference to the accompanying drawings.

Embodiment 1

Figure 1:
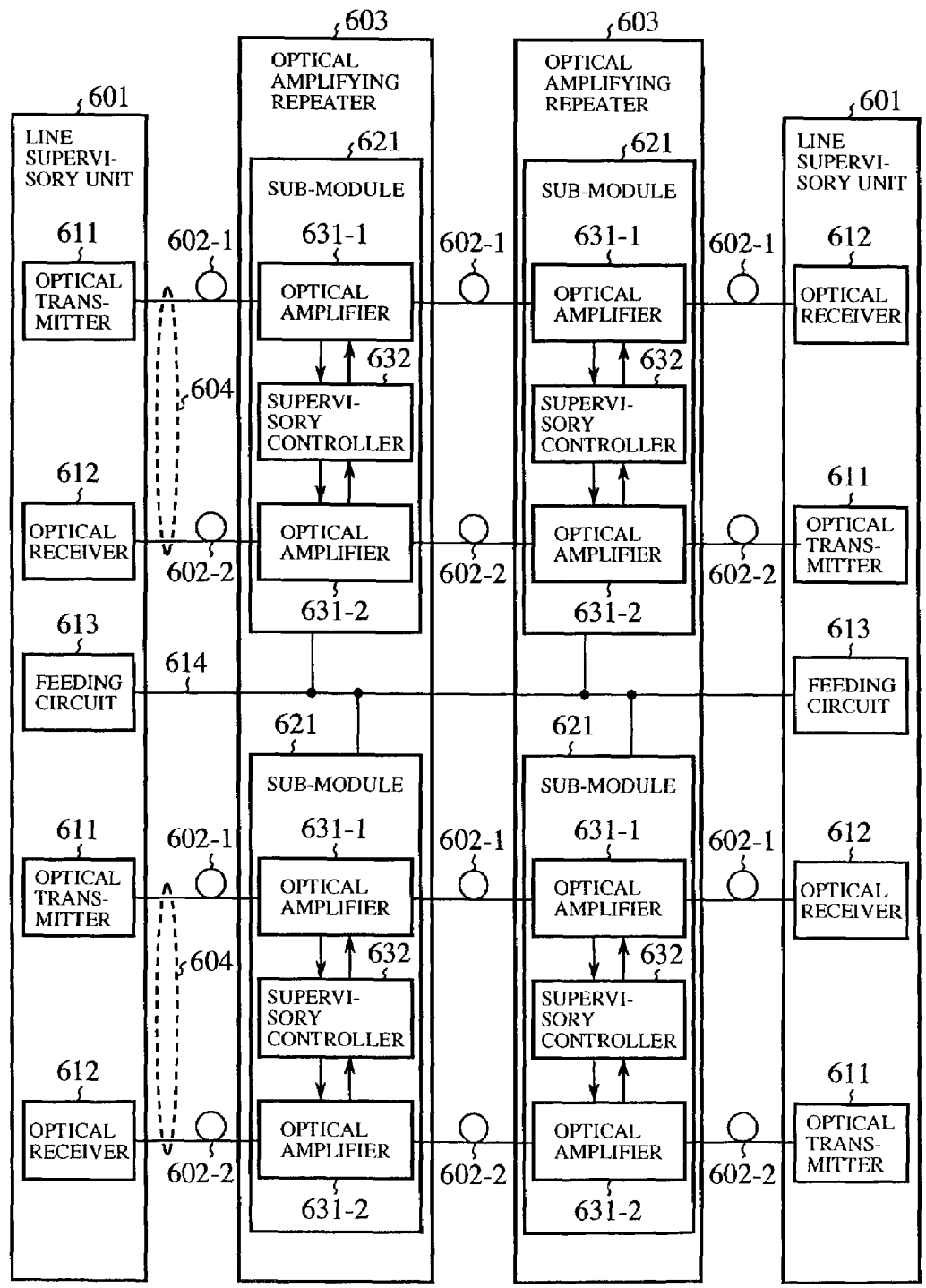
FIG. 1 is a block diagram showing a configuration of an embodiment 1 of the optical repeating system in accordance with the present invention.
Figure 7:
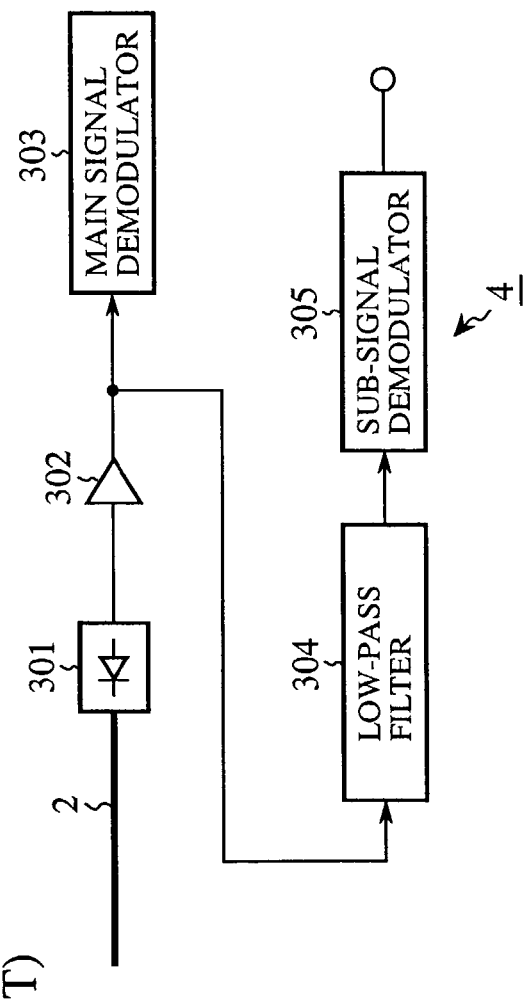
FIG. 7 is a block diagram showing a configuration of the optical receiver of FIG. 4.

FIG. 1 is a block diagram showing a configuration of an embodiment 1 of the optical repeating system in accordance with the present invention. In FIG. 1, the reference numeral 601 designates a line supervisory unit. The line supervisory unit 601 comprises optical transmitters 611 and optical receivers 612 serving as terminals of uplink and downlink bidirectional optical transmission lines, each of which consists of the optical fibers 602-1 and 602-2. The line supervisory unit 601 further comprises a feeding circuit 613 for supplying current to each optical amplifying repeater 603 via a feeder line 614. When the optical transmitter 611 specifies a single optical amplifying repeater 603 and sends it a first sub-signal including the supervisory command, it specifies the optical amplifying repeater 603 by an address code proper to the optical amplifying repeater 603. On the other hand, when the optical transmitter 611 specifies a plurality of optical amplifying repeaters 603 and sends them a common first sub-signal, it specifies the optical amplifying repeaters 603 by a special code proper to the optical amplifying repeaters 603. As the special code, it is possible to use a code that specifies two to N optical amplifying repeaters 603, where N is the total number of the optical amplifying repeaters 603. In this case, each optical amplifying repeater 603 specified has the special code stored in advance. In addition, any one of the optical amplifying repeaters 603 can have a plurality of special codes, and part of the optical amplifying repeaters 603 may have no special code. Here, the optical receivers 612 have the same configuration as that of FIG. 7.

In FIG. 1, reference numerals 602-1 and 602-2 each designate an optical fiber constituting the bidirectional optical transmission line; and 603 designates an optical amplifying repeater that amplifies main signals on a plurality of bidirectional optical transmission lines, and that comprises a plurality of sub-modules 621 for receiving the first sub-signal and carries out the processing thereof. In FIG. 1, a pair of the bidirectional optical transmission lines are installed, where each bidirectional optical transmission line is defined as an optical fiber pair 604 consisting of the optical fiber 602-1 and optical fiber 602-2.

In each sub-module 621, the reference numeral, 631-1 designates an optical amplifier mounted on the uplink optical transmission line (optical fiber 602-1) for amplifying the main signal; 631-2 designates an optical amplifier mounted on the downlink optical transmission line (optical fiber 602-2) for amplifying the main signal; and 632 designates a supervisory controller. The supervisory controller receives the first sub-signal from the optical transmitter 611 via the uplink optical transmission line or the downlink optical transmission line. When the supervisory controller makes a decision that the received supervisory command is addressed to it by referring to its own prestored address code and the special code of the group to which it belongs, it transmits the supervisory signal indicating the supervisory result associated with the supervisory command to the individual optical receivers 612 via the uplink optical transmission line and the downlink optical transmission line as the second sub-signal.

Figure 2:
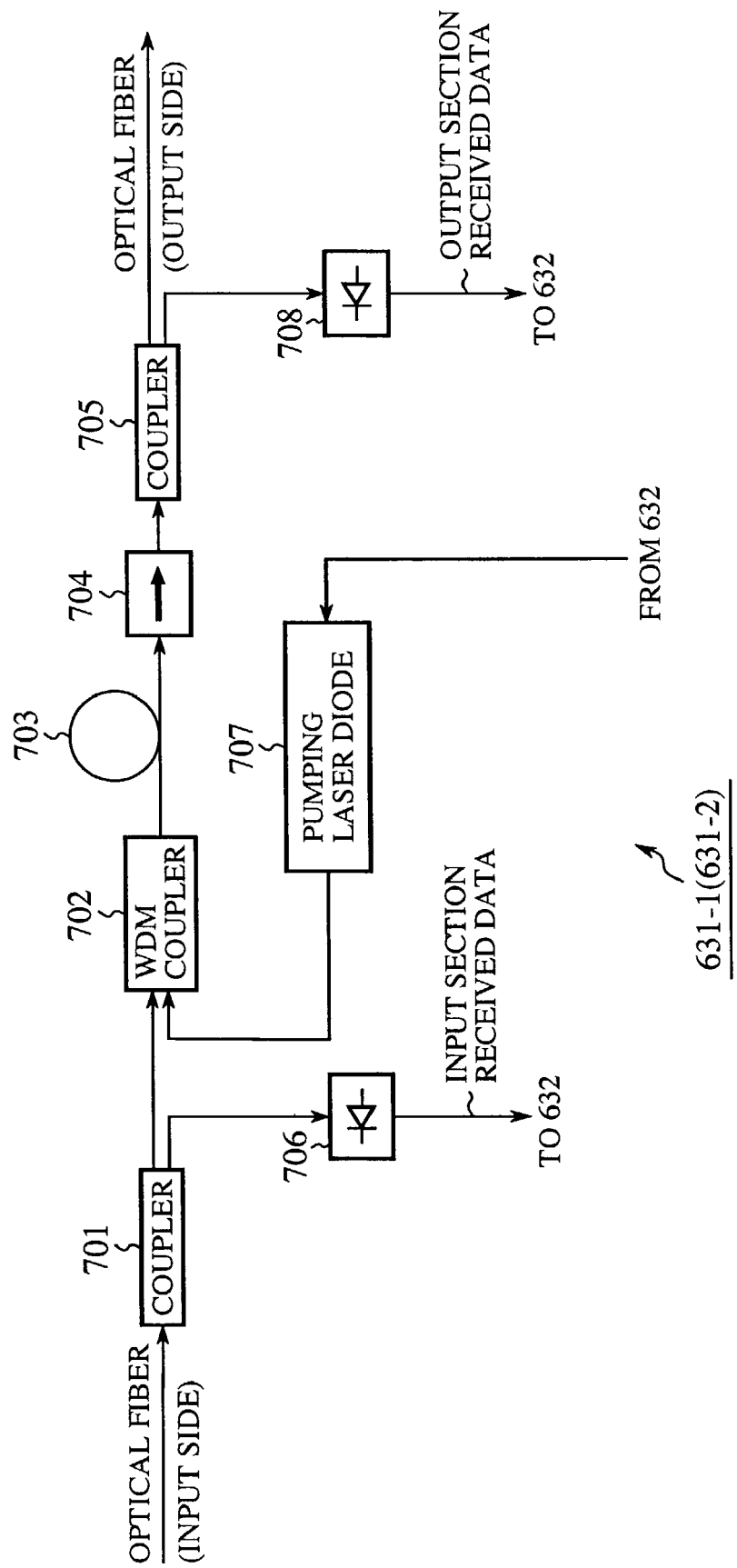
FIG. 2 is a block diagram showing a configuration of an optical amplifier:of FIG. 1.

FIG. 2 is a block diagram showing a configuration of the optical amplifier 631-1 or 631-2 as shown in FIG. 1. In FIG. 2, the reference numeral 701 designates a coupler for splitting the input optical signal; 702 designates a WDM (Wavelength Division Multiplexing) coupler for combining the optical signal with the pumping laser light; 703 designates an erbium (Er) doped fiber; 704 designates an isolator; and 705 designates a coupler for splitting the amplified optical signal, and outputting its first part as the output optical signal. The reference numeral 706 designates a photoelectric converter for converting the optical signal into an electrical signal; 707 designates a pumping laser diode for applying the pumping laser light to the erbium (Er) doped fiber 703 via the WDM coupler 702; and 708 designates a photoelectric converter for converting the optical signal to an electrical signal.

Figure 3:
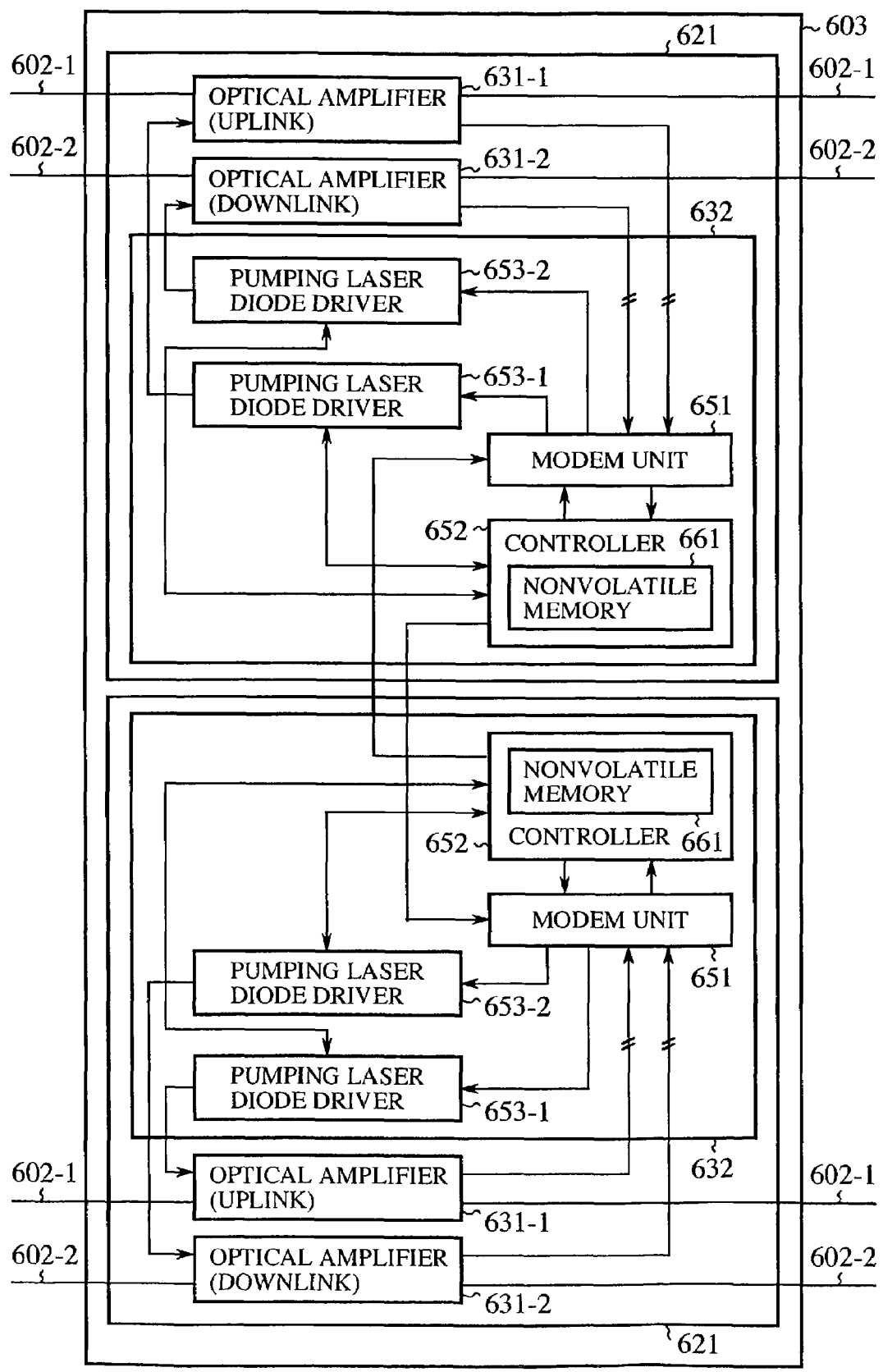
FIG. 3 is a block diagram showing a configuration of an optical amplifying repeater of FIG. 1.
Figure 4:
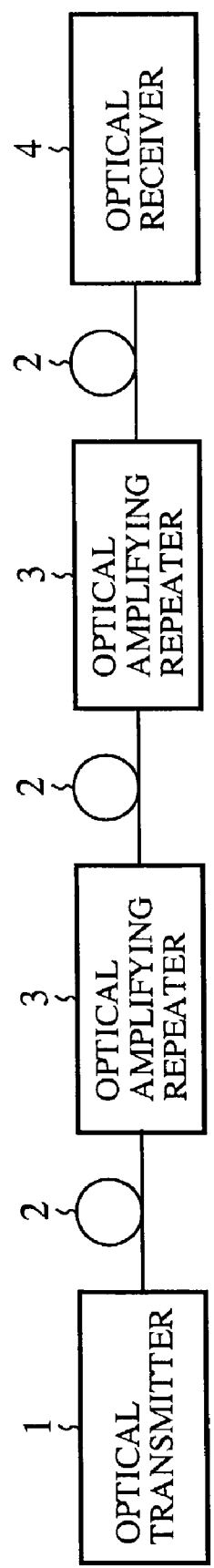
FIG. 4 is a block diagram showing a configuration of a conventional optical repeating system.
Figure 5:
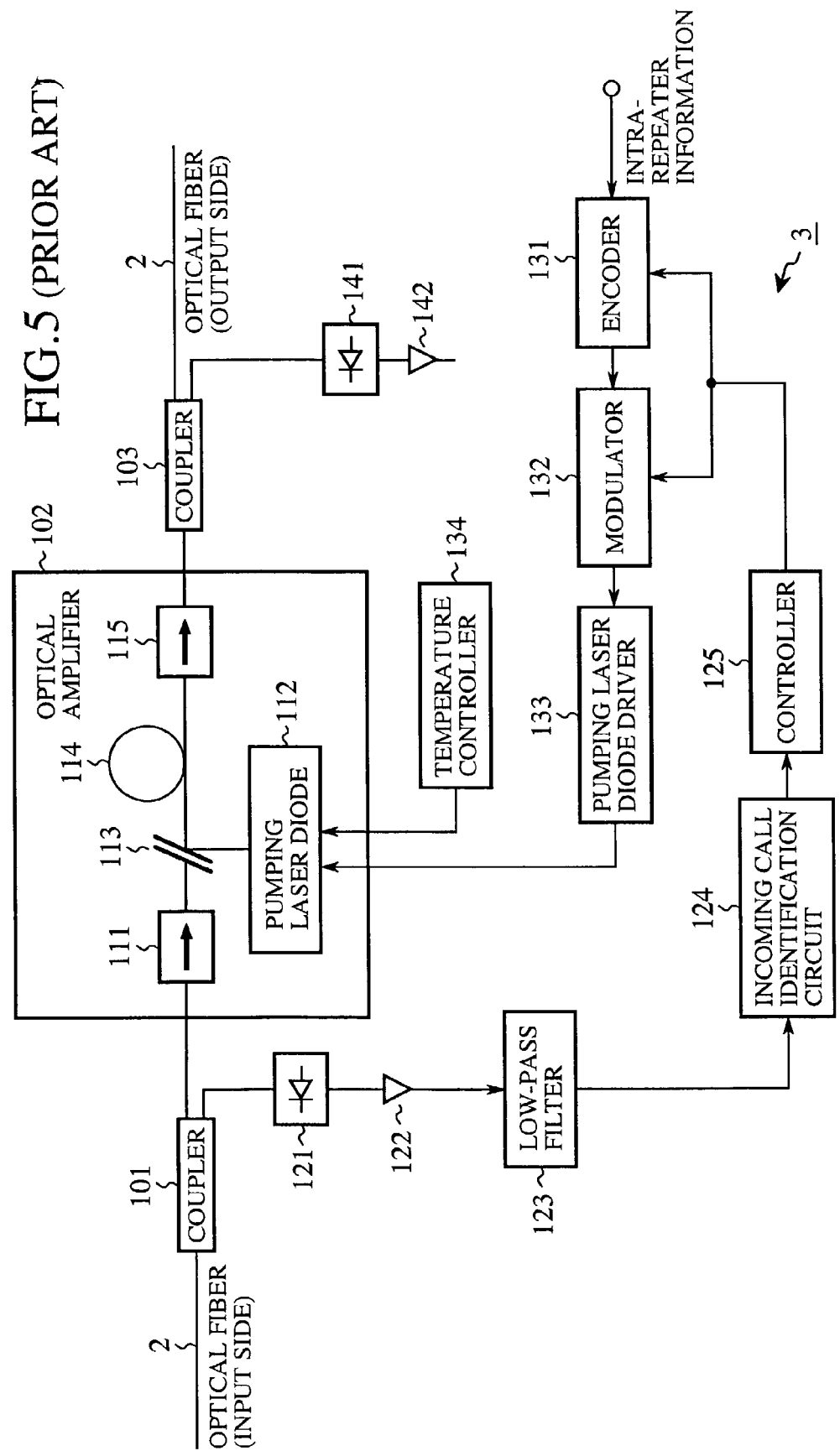
FIG. 5 is a block diagram showing a configuration of an optical amplifying repeater of FIG. 4.
Figure 6:
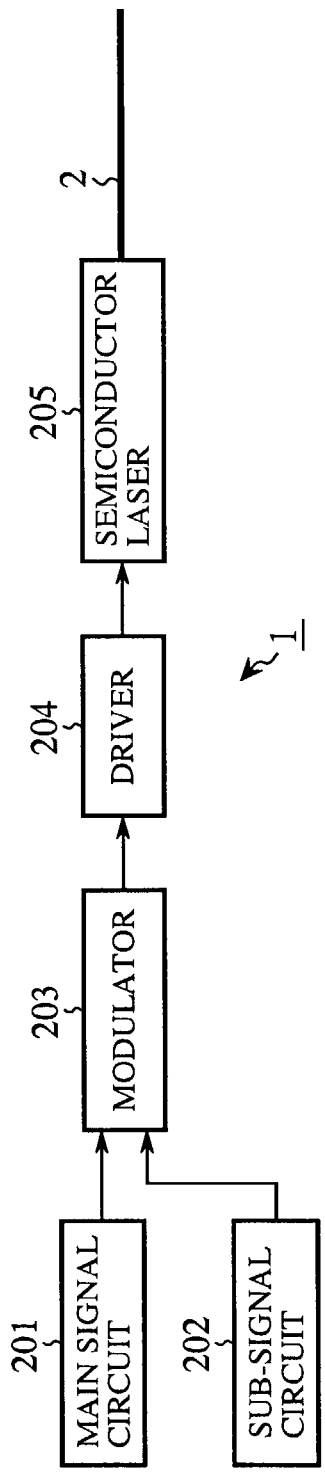
FIG. 6 is a block diagram showing a configuration of the optical transmitter of FIG. 4.

FIG. 3 is a block diagram showing a configuration of the optical amplifying repeater 603 as shown in FIG. 1. In FIG. 3, the reference numeral 651 designates a modem unit. The modem unit 651 extracts and demodulates the first sub-signal sent from the optical transmitter 611 of the line supervisory unit 601. It also modulates the driving current to the pumping laser diode 707 by the supervisory signal that includes various items of the intra-repeater information obtained in correspondence to the supervisory command. It carries out the modulation by controlling the pumping laser diode drivers 653-1 and 653-2, thereby superimposing the supervisory signal on the main signal as the second sub-signal. The reference numeral 652 designates a controller that makes a decision as to whether the first sub-signal includes the address code of its own or the special code of its own group. When detecting the supervisory command addressed thereto, the controller 652 collects the intra-repeater information, and supplies the modem unit 651 with the supervisory signal indicating the intra-repeater information. The reference numeral 661 designates a nonvolatile memory such as an FRAM (Ferro-electric Random Access Memory) and MRAM (Magneto-resistive Random Access Memory) for storing the address code of its own and one or more special codes of its own, the set values of the amplification factors of the optical amplifiers 631-1 and 631-2, the intra-repeater information and the like. The reference numeral 653-1 designates the pumping laser diode driver, for supplying the driving current to the pumping laser diode 707 of the optical amplifier 631-1; and 653-2 designates a pumping laser diode driver for supplying the driving current to the pumping laser diode 707 of the optical amplifier 631-2.

Next, the operation of the present embodiment 1 will be described.

The feeding circuits 613 of the line supervisory units 601 at both ends of the optical transmission line feed a current to the individual optical amplifying repeaters 603 through the feeder line 614.

Then, the optical transmitter 611 of the line supervisory unit 601 transmits the main signal to the optical receiver 612 of the far-end line supervisory unit 601. In addition, when transmitting a supervisory command to a single optical amplifying repeater 603, the optical transmitter 611 superimposes on the main signal the first sub-signal that contains the address code proper to the specified optical amplifying repeater 603 and the supervisory command. In contrast, when transmitting a supervisory command to a plurality of optical amplifying repeaters 603 simultaneously, the optical transmitter 611 superimposes on the main signal the first sub-signal that contains the special code proper to the specified optical amplifying repeaters 603 and the supervisory command.

In this case, the optical transmitter 611 modulates a carrier by the main signal, superimposes the first sub-signal, converts the resultant electrical signal to the optical signal, and supplies the optical signal to the optical fiber 602-1 (or 602-2)

Subsequently, receiving the optical signal via the, optical fiber 602-1 (602-2), the optical amplifying repeater 603 operates as follows. First, the coupler 701 splits the optical signal, and supplies a first part of the optical signal to the Er doped optical fiber 703 via the WDM coupler 702. In this case, the WDM coupler 7 02 combines the first part of the optical signal with the pumping laser light fed from the pumping laser diode 707. Then, the optical signal amplified by the Er doped optical fiber 703 is launched into the coupler 705 via the isolator 704 to be split by the coupler 705, and a first part of the split optical signal is supplied to the optical fiber 602-1 (602-2). Thus, the main signal is amplified and repeated by the optical amplifier 631-1 (631-2) of the optical amplifying repeater 603.

On the other hand, a second part of the optical signal split by the coupler 701 is converted into an electrical signal by the photoelectric converter 706, and the electrical signal is supplied to the modem unit 651 of the supervisory controller 632. Likewise, a second part of the optical signal split by the coupler 705 is converted into an electrical signal by the photoelectric converter 708, and the electrical signal is supplied to the modem unit 651 of the supervisory controller 632.

The modem unit 651 extracts and demodulates only the first sub-signal from the electrical signal fed from the photoelectric converter 706, and supplies it to the controller 652. The modem unit 651 also measures the power level of the output optical signal from the electrical signal fed from the photoelectric converter 708, and notifies the controller 652 of the power level.

The controller 652, referring to its uniquely assigned address code and the special code of its own group that are stored in the nonvolatile memory 661, makes a decision as to whether the first sub-signal contains the same address code as the uniquely, assigned address code or the same special code as the special code of its own group. When the first sub-signal contains the same address code or the special code, the controller 652 performs the processing corresponding to the supervisory command contained in the first sub-signal. On the other hand, when the first sub-signal does not include the address code or the special code, the controller 652 disregards the first sub-signal.

Detecting the supervisory command addressed to the repeater, the controller 652 collects the intra-repeater information in response to the supervisory command. The intra-repeater information includes such information items as the modulation factors of the first and second sub-signals (described later) (the amplitude intensity of the first and second sub-signals) in terms of the main signal, the power levels of the input and output optical signals of the optical amplifying repeater 603, the amplification factors of the optical amplifiers 631-1 and 631-2, and the driving current level for the pumping laser diode 707.

As the supervisory command, there are a start command for starting collection of the intra-repeater information, a selection command for selecting information to be transmitted to the optical receiver 612 from the intra repeater information after collecting the intra-repeater information, and a transmission command for transmitting the selected information. For example, the optical transmitter 611 sends the start command, and then the selection command after a sufficient time period has elapsed to collect the intra-repeater information, followed by sending the transmission command. Incidentally, the these commands can be sent at once as a single command instead of sending them step by step.

After collecting the intra-repeater information, the controller 652 converts the analog values of the information to digital data, and supplies the data to the modem unit 651. The modem unit 651 generates the supervisory signal by modulating a prescribed subcarrier different from the carrier of the main signal. Then, the modem unit 651 modulates the driving current of the pumping laser diode 707 in the optical amplifier 631-1 and that of the pumping laser diode 707 in the optical amplifier 631-2 by the supervisory signal by controlling the pumping laser diode drivers 653-1 and 653-2, thereby superimposing the supervisory signal on both the uplink and downlink main signals as the second sub-signal. In the course of this, the controller 652 generates the digital data within a predetermined quantization error, temporarily stores the data in a memory not shown, and reads the data of the selected supervisory information from the memory when it detects the selection command.

The optical receiver 612 in the far-end line supervisory unit 601 opposing to the line supervisory unit 601 that transmits the supervisory command receives the optical signal via the optical fiber 602-1 or 602-2. After converting the optical signal to the electrical signal, the optical receiver 612 demodulates it to the main signal and first and second sub-signals. Likewise, the optical receiver 612 of the line supervisory unit 601 that transmits the supervisory command receives the second sub-signal via the reverse direction optical fiber 602-2 or 602-1. The line supervisory unit 601 displays the supervisory information obtained from the second sub-signal on a display not shown or prints it out by a printer not shown.

When the supervisory controller 632 does not receive the command addressed thereto, it only drives the pumping laser diodes 707 with a reference current without performing the superimposition of the second sub-signal. Incidentally, each sub-modules 621 can carry out the supervision and control of the optical amplifying repeater 603 via the optical transmission line.

In addition, the address code and the special code of each optical amplifying repeater can be stored in the nonvolatile memory 661 in advance, or can be transmitted in the first sub-signal after the setup to be stored additionally. Alternatively, the address code and/or special code stored in the nonvolatile memory 661 can be updated by transmitting these codes in the first sub-signal to each optical amplifying repeater.

As described above, the present embodiment 1 is configured such that the optical transmitter 611 specifies a part or all of the plurality of optical amplifying repeaters 603, and transmits a supervisory command to supervise their internal circuits as the first sub-signal via the uplink or downlink optical transmission line, and that when each optical amplifying repeater 603 receives the supervisory command addressed thereto via the uplink or downlink optical transmission line, it transmits the supervisory signal indicating the supervisory result associated with the supervisory command to the optical receivers via the uplink and downlink optical transmission lines as the second sub-signal. Thus, the present embodiment 1 offers an advantage of being able to reduce the time taken to acquire the supervisory information about the plurality of optical amplifying repeaters 603.

Furthermore, the present embodiment 1 is configured such that it transmits the supervisory signal corresponding to the supervisory command to the optical receivers 612 of the line supervisory units 601 at both ends through the optical transmission lines in both directions. Therefore, it offers an advantage of enabling the line supervisory unit 601 at one end that transmits the supervisory command to acquire the supervisory information corresponding to the supervisory command in a short time, and particularly when transmitting the supervisory command successively, to supervise the individual optical amplifying repeaters 603 quickly.

Moreover, the present embodiment 1 is configured such that the feeding circuits 613 installed at both ends of the feeder line 614 supply current to the optical amplifying repeaters 603. As a result,,the present embodiment 1 offers an advantage of being able to shorten the average distance from the feeding circuits 613 to the, plurality of optical amplifying repeaters 603, thereby making it possible to decrease the supply voltage reduction to the optical amplifying repeaters 603.

Embodiment 2

The present embodiment 2 of the optical repeating system in accordance with the present invention is configured such that it transmits the second sub-signal to the optical receiver 612 via a pair of optical transmission lines different from a, pair of the optical transmission lines that receives the first sub-signal among the plurality of pairs of the uplink and downlink optical transmission lines.

Specifically, when there are two pairs of the uplink and downlink optical transmission lines as shown in FIG. 1, and if one pair, of the optical transmission lines has a failure, the controller 652 of the supervisory controller 632 in the sub-module 621 of the faulty system controls the modem unit 651 of the supervisory controller 632 in the sub-module 621 of the faultless system, so that the second sub-signal is transmitted to the optical receivers 612 to which the second sub-signal cannot be transmitted via the faulty system.

Since the remaining configuration and the operation of the embodiment 2 of the optical repeating system are the same as those of the foregoing embodiment 1, the description thereof is omitted here.

As described above, the present embodiment 2 is configured such that it transmits the second sub-signal to the optical receiver 612 via a pair of the optical transmission lines different from that through which the first sub-signal is received among a plurality of pairs of the uplink and downlink optical transmission lines. As a result, the present embodiment 2 offers an advantage of being able to acquire the supervisory information even if one of the systems suffers from a failure, thereby improving the redundancy.

Although the foregoing embodiments 1 and 2 are described taking an example where the number of the optical amplifying repeaters 603 is two, it is obvious that any number of the optical amplifying repeaters are allowable. Besides, although two uplink/downlink optical fibers 602-1 and 602-2 are provided, any number of the optical fibers are applicable.

What is claimed is:

1. An optical repeating system comprising:
an uplink optical transmission line;
a downlink optical transmission line;
optical transmitters and optical receivers for transmitting and receiving a main signal via at least one of the uplink and downlink optical transmission lines; and
a plurality of grouped optical amplifying repeaters each installed at an intermediate position on the optical transmission lines for amplifying and repeating the main signal with optical amplifiers, wherein
at least one of said optical transmitters specifies a group of at least two of said plurality of optical amplifying repeaters, and transmits a supervisory command to of optical amplifying repeaters in the group as a first sub-signal, the supervisory command commanding to supervise internal circuits of said optical amplifying repeaters in the group, and wherein
said optical amplifying repeaters in the group each transmit, when receiving the supervisory command addressed thereto via one of the uplink and downlink optical transmission lines, a supervisory signal indicating supervisory result corresponding to the supervisory command to said optical receivers as a second sub-signal via said uplink optical transmission line and said downlink optical transmission line,
and when specifying said group, one of said optical transmitters superimposes on the main signal a unique group identifier, and wherein each of said plurality of optical amplifying repeaters in the group store the unique group identifier in advance, and make a decision that they themselves are specified when they detect the unique group identifier in the main signal.

2. The optical repeating system according to claim 1, wherein said plurality of optical amplifying repeaters are each connected to a plurality of sets of uplink and downlink optical transmission lines, and transmit the second sub-signal through a set of optical transmission lines different from that through which the first sub-signal is received.

3. An optical amplifying repeater control method of controlling an optical amplifying repeater in an optical repeating system including:
an uplink optical transmission line;
a downlink optical transmission line;
optical transmitters and optical receivers for transmitting and receiving a main signal via at least one of the uplink and downlink optical transmission lines; and
a plurality of grouped optical amplifying repeaters each installed at an intermediate position on the optical transmission lines for amplifying and repeating the main signal with optical amplifiers,
said optical amplifying repeater control method comprising:
specifying group of at least two of said plurality of optical amplifying repeaters, and transmitting a supervisory command to specified optical amplifying repeaters in the group as a first sub-signal via one of said uplink and downlink optical transmission lines, the supervisory command commanding to supervise internal circuits of said optical amplifying repeaters in the group, wherein when said specifying includes superimposing on the main signal a unique group identifier, each of said plurality of optical amplifying repeaters in the group storing the unique group identifier in advance;
receiving the supervisory command addressed to said amplifying repeaters themselves via one of said uplink and downlink optical transmission lines;
determining if each amplifying repeater is in the group based on each amplifying repeater detecting the unique group identifier in the main signal; and
transmitting, for each optical amplifying repeater in the group, a supervisory signal indicating supervisory result corresponding to the supervisory command as a second sub-signal to said optical receivers via said uplink optical transmission line and said downlink optical transmission line.

* * * * *